(12) United States Patent
Woll

(10) Patent No.: US 6,991,303 B2
(45) Date of Patent: Jan. 31, 2006

(54) HYDRAULIC BRAKING SYSTEM OPERATED BY AN EXTERNAL FORCE

(75) Inventor: Peter Woll, Bruchsal (GB)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/809,292

(22) Filed: Mar. 25, 2004

(65) Prior Publication Data

US 2004/0207252 A1    Oct. 21, 2004

Related U.S. Application Data

(63) Continuation-in-part of application No. PCT/EP02/08187, filed on Jul. 23, 2002.

(51) Int. Cl.
*B60T 8/40* (2006.01)
(52) U.S. Cl. .................................. 303/116.2; 303/113.1
(58) Field of Classification Search .................... 303/3, 303/20, 113.1, 113.4, 116.1, 116.2, 122, 122.04, 303/122.09; 188/352
See application file for complete search history.

(56) References Cited

U.S. PATENT DOCUMENTS

| | | | |
|---|---|---|---|
| 5,588,718 A * | 12/1996 | Winner et al. ........... | 303/113.1 |
| 5,866,822 A | 2/1999 | Willig | |
| 5,941,608 A * | 8/1999 | Campau et al. .......... | 303/113.4 |
| 5,951,120 A * | 9/1999 | Shimura et al. ......... | 303/113.1 |
| 5,988,768 A | 11/1999 | Schaefer et al. | |
| 6,007,163 A * | 12/1999 | Sawada .................... | 303/116.2 |
| 6,076,897 A * | 6/2000 | Binder et al. ............ | 303/116.1 |
| 6,705,683 B2 * | 3/2004 | Niepelt et al. ......... | 303/122.13 |
| 6,817,681 B2 * | 11/2004 | Fey et al. ................ | 303/113.4 |

FOREIGN PATENT DOCUMENTS

| | | |
|---|---|---|
| DE | 43 43 386 | 6/1995 |
| DE | 196 22 726 | 12/1997 |
| DE | 196 36 432 | 3/1998 |
| DE | 199 10 618 | 10/1998 |
| DE | 198 53 036 | 6/1999 |
| DE | 198 26 346 | 10/1999 |
| DE | 199 58 304 | 6/2000 |

* cited by examiner

*Primary Examiner*—Thomas Williams
(74) *Attorney, Agent, or Firm*—Klaus J. Bach

(57) ABSTRACT

In a hydraulic braking system operated by an external force, for vehicles, in particular motor vehicles, having a primary pressure source which is operated by external energy and provide brake pressure to the wheel brakes during normal operation, and which also has a foot-actuated auxiliary pressure source which supplies the wheel brakes with brake pressure during emergency operation, to increase the degree of safety, a special hydraulic circuit is provided wherein, during emergency operation, only comparatively few valves between the wheel brakes and a hydraulic reservoir have to be closed so as to be free of leakage, while operational safety is increased by the valves being connected in series.

8 Claims, 2 Drawing Sheets

HYDRAULIC BRAKING SYSTEM OPERATED BY AN EXTERNAL FORCE

This is a Continuation-In-Part Application of international application PCT/EP02/08187 filed Jul. 23, 2002 and claiming the priority of German application 101 47 150.5 filed Sep. 25, 2001.

BACKGROUND OF THE INVENTION

The invention relates to a hydraulic braking system operated by an external force, for vehicles, in particular motor vehicles, with at least two axles or axle lines, with
- a pressureless or low-pressure-side hydraulic reservoir,
- at least one primary pressure source which is fed by external energy and is connected to the hydraulic reservoir for the supply of hydraulic medium,
- an auxiliary pressure source which is independent of the primary pressure source and can be actuated by foot or hand and which is connected to the hydraulic reservoir for the supply of a hydraulic medium and the delivery side of which communicates with the hydraulic reservoir in the non-actuated state of the auxiliary pressure source,
- displacer assemblies, which are assigned in each case to a wheel brake separately for the actuation of the latter,
- normally closed controllable inlet valves which are in each case assigned separately to a displacer assembly for the controllable connection of the latter to the primary pressure source or to one of the primary pressure sources,
- normally open connecting valves which are assigned separately to each displacer assembly and parallel to the respective inlet valve and which are connected to one another, axle by axle, on their side facing away from the assigned displacer assembly,
- a normally closed outlet valve which is arranged between the hydraulic reservoir and the interconnected sides of the connecting valves of a first axle,
- a normally open blocking valve which is arranged between the delivery side of the auxiliary pressure source and the interconnected sides of the connecting valves of a first axle.

Such a braking system operated by an external force is the subject of U.S. Pat. No. 5,988,768.

In this braking system operated by an external force, moreover, the pedal actuating the auxiliary pressure source actuates a desired-value generator of a regulating arrangement which shuts off the separating valve and opens the outlet valve when the braking system operated by an external force is functioning normally. Otherwise, depending on the respective desired value, the control arrangement controls the inlet and connecting valves of the displacer assembly of the wheel brakes as a function of the sensor-detected hydraulic actual pressure of the displacer assemblies or wheel brake cylinders.

Should the pressure of the primary pressure source faultily fall, the separating valve and the connecting valves automatically fall back to their normally open state, while the inlet valves and the outlet valve change over to their normally closed state. The brake cylinders of the axle assigned to the outlet valve can consequently be actuated by means of the auxiliary pressure source.

Similar braking systems are the subject of DE 43 43 386 A1 and of U.S. Pat. No. 5,866,822.

A braking system operated by an external force, known from DE 196 36 432 A1, possesses a pressureless hydraulic reservoir, a primary pressure source, which consists of an electric motor driven pump connected on the suction side to the hydraulic reservoir and of a pressure accumulator which is arranged on the delivery side of the pump and is protected against discharge by the pump by means of a non-return valve and which is recharged by the pump as a function of pressure, and a pedal-actuated auxiliary pressure source which is independent of said primary pressure source and is designed in the manner of a conventional brake master cylinder arrangement and the delivery side of which communicates with the hydraulic reservoir in the non-actuated state of the auxiliary pressure source. Furthermore, each vehicle wheel is provided with a wheel brake with a displacer assembly or wheel brake cylinder for actuating the wheel brake. These displacer assemblies can be connected in each case via normally closed controllable inlet valves to the delivery side of the primary pressure source or to the pressure accumulator and, for pressure relief, can be connected to the hydraulic reservoir via normally closed controllable outlet valves assigned separately to each wheel brake. Moreover, the wheel brake cylinders of the wheels of each axle are connected to one another via a connecting line which can be separated by means of a normally open stop valve and which communicates on one side of the stop valve with the auxiliary pressure source via a normally open valve.

In this braking system operated by an external force, moreover, the pedal of the auxiliary pressure source actuates a desired-value generator of a regulating arrangement which, when the braking system operated by an external force is functioning normally, shuts off the separating valves and, depending on the respective desired value, controls the inlet and outlet valves of the displacer assemblies of the wheel brakes as a function of the sensor-detected hydraulic actual pressure of the wheel brake cylinders. In this case, on the one hand, wheel-by-wheel control of the pressure of the displacer assemblies is possible; for this purpose, the shut-off valves between the displacer assemblies of an axle are closed and the pressures of the displacer assemblies are set by means of the inlet and outlet valves assigned to them. On the other hand, axle-by-axle pressure control of the displacer assemblies may also take place in that the connecting valves between the displacer assemblies of an axle are opened. In this case, to control the pressure of the displacer assemblies communicating with one another, it is sufficient merely to actuate one of the inlet valves assigned to these displacer assemblies and one of the assigned outlet valves, while the remaining inlet and outlet valves remain closed.

All the inlet and outlet valves of this braking system operated by an external force are designed as identical differential-pressure solenoid valves, so that the maximum obtainable hydraulic pressure remains limited even when the pump charging the pressure accumulator faultily operates continuously, although the pressure accumulator has already reached its charging pressure.

Should the pressure of the pressure accumulator faultily fall, the separating and connecting valves automatically fall back into their normally open state, while the inlet and outlet valves change over to their normally closed state. The brake cylinders and, correspondingly, the wheel brakes can then be actuated by means of the auxiliary pressure source.

DE 196 22 726 A1 discloses a hydraulic vehicle braking system, in which each vehicle wheel is assigned a wheel brake with a displacer assembly or wheel brake cylinder for actuating said wheel brake. These displacer assemblies can be connected in each case via normally opened controllable inlet valves to the brake master cylinder or the delivery side of a return pump and, for pressure relief, to the suction side of the return pump via normally closed controllable outlet valves assigned separately to each wheel brake. A normally open controllable changeover valve is arranged between the master brake cylinder and the circuit between the displacer assemblies and return pump. A normally closed controllable intake valve is arranged, parallel to this changeover valve, between the brake master cylinder and the suction side of the return pump.

It is the object of the present invention to provide a braking system operated by an external force, which, on the one hand, allows multiply variable control and, on the other hand, has a particularly high safety reserve.

SUMMARY OF THE INVENTION

In a hydraulic braking system operated by an external force, for vehicles, in particular motor vehicles, having a primary pressure source which is fed by external energy and supplies the wheel brakes with brake pressure during normal operation, and having a foot-actuated auxiliary pressure source which supplies the wheel brakes with brake pressure during emergency operation, the degree of safety is increased in that a special hydraulic circuit is provided wherein only comparatively few valves between the wheel brakes and a hydraulic reservoir have to be closed and be free of leakage, and the safety is increased by the valves being connected in series.

In the case of an emergency braking operation by means of the auxiliary pressure source, the series connection of the outlet valves affords an extreme degree of safety, in that at least the displacer assemblies of the first axle, typically the front axle, remain operable by means of the auxiliary pressure source, because maintenance of the pressure is ensured by the serially arranged outlet valves.

The invention and preferred features thereof will be described below on the basis of the accompanying drawings:

DESCRIPTION OF A PARTICULAR EMBODIMENT

Figure 1:
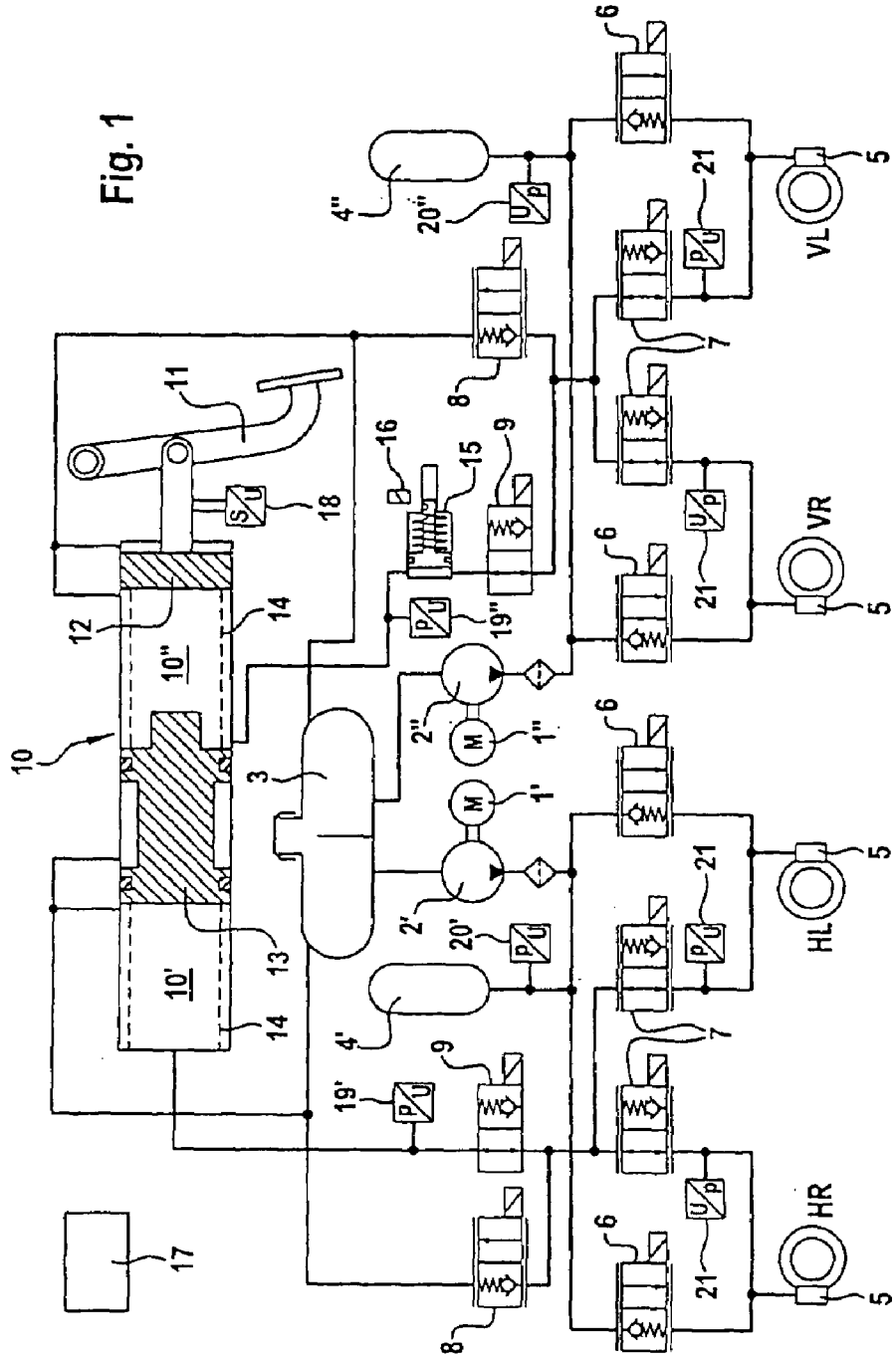
FIG. 1 shows a circuit diagram, of a braking system operated by an external force in accordance with U.S. Pat. No. 5,988,768.

The braking system operated by an external force, illustrated in FIG. 1, includes two hydraulic pumps 2' and 2", which are driven by separate electric motors 1' and 1" and which are connected in each case on the suction side to a chamber of an essentially pressureless hydraulic reservoir 3 and on the delivery side to a hydraulic pressure accumulator 4' and 4'.

Each pump 2' or 2" or each pressure accumulator 4' or 4" is assigned actuating assemblies of the wheel brakes of the front wheels VR, VL and of the rear wheels HR and HL, said actuating assemblies being displacer assemblies 5, typically known as wheel brake cylinders.

Each displacer assembly 5 can be connected to the assigned hydraulic pump 2' or 2" or to the assigned pressure accumulator 4' or 4" via a normally closed controllable inlet valve 6. A normally open controllable connecting valve 7 is arranged in parallel with the respective inlet valve 6. In each displacer assembly 5, the connecting valves 7 of the front wheels VR and VL, on the one hand, and of the rear wheels HR and HL, on the other hand, are connected to one another on their side facing away from the assigned displacer assemblies 5.

The connecting valves 7 of the front wheels VR and VL and the connecting valves 7 of the rear wheels HR and HL are connected, on their interconnected side, to an outlet valve 8 which is common to the front wheels and to the rear wheels and which is normally closed and allows for a controllable connection to the reservoir 3.

Connected in each case parallel to the outlet valves 8 is a normally open separating valve 9, via which the interconnected sides of the connecting valves 5 of an axle are connected to a respective working chamber 10' or 10" of a basically conventional dual-circuit master brake cylinder 10. The master brake cylinder 10 is actuated in the usual way by means of a brake pedal 11. The brake pedal 11 is coupled directly mechanically to a piston 12 and hydraulically to a floating piston 13. The pistons 12 and 13 are urged by springs 14 into the initial position as illustrated which the working chambers 10' and 10" also communicate each with a chamber of the hydraulic reservoir 3. As soon as the pistons 12 and 13 are displaced somewhat to the left of FIG. 1, the connection of the working chambers 10' and 10" to the reservoir 3 is interrupted.

A simulator 15, the purpose of which is explained in more detail below, is arranged on the line leading from the working chamber 10" to the separating valve 9 of the front axle. The simulator consists essentially of a piston/cylinder assembly, the piston of which is loaded by means of a spring in such a way that the piston seeks to reduce the chamber connected to the line between the working chamber 10" and the separating valve 9. The piston of the simulator can be retained immovably by means of an electro-magnetic locking member 16.

An electronic control 17 is connected on the input side to a multiplicity of sensors, for example a travel sensor 18 for the stroke of the pedal 11, pressure sensors 19' and 19" for the pressures in the working chambers 10' and 10", pressure sensors 20' and 20" for the pressures of the pressure accumulators 4' and 4", and pressure sensors 21 for the pressures of the displacer assemblies 5 of the respective wheel brakes. Furthermore, the electronic control device 17 is regularly connected to a sensor cluster, not illustrated, by means of which parameters of the respective driving situation are detected, for example the rotational speeds of the vehicle wheels, acceleration of the vehicle body and the respective steering angle.

The control device 17 is connected on the output side to the electromagnets of all the valves 6 to 9 for the actuation of the latter. Moreover, the control 17 controls the motors 2' and 2" of the pumps 1' and 1".

The system illustrated in FIG. 1 operates as follows, normal operation being considered first:

When the driver wishes to brake the vehicle, he actuates the brake pedal 11, so that the travel sensor 18 or a limit switch combined with it generates a signal for "actuated brake pedal". As a result the control device 17 activates the electromagnets of the blocking valves 9 and closes them. When the brake pedal 11 is actuated further, hydraulic medium is pushed out of the working chamber 10" of the brake master cylinder 10 into the simulator 15. At the same time, the travel sensor 18 signals a corresponding stroke of the brake pedal 11, and the pressure sensors 19' and 19" signal a pressure which increases with the pedal travel and which is determined essentially by the characteristic of the spring loading the piston of the simulator. The travel signals from the travel sensor 18 and the pressure signals from the pressure sensors 19' and 19" are evaluated by the control device 17 as desired-value stipulations for a desired brake actuation or braking deceleration, that is to say the control device 17 must then set a corresponding brake pressure at the displacer assemblies 5 of the wheel brakes. For this purpose, on the one hand, the outlet valves 8 and/or the connecting valves 7 are closed or kept closed and, on the other hand, the inlet valves 6 are at least partially opened. The pressure set in each case at the displacer assemblies 5 of the wheel brakes can then be determined by the electronic control device 17 from the signals of the pressure sensors 21, and the respective desired pressure setting on the one hand, can be increased by opening or increasing the opening of the inlet valves 6 and, on the other hand, can be carried out by opening, or increasing the opening, of the connecting valves 7, with the outlet valves 8 kept open, or by opening, or increasing the opening, of the outlet valves 8, with the connecting valves 7 being kept open. If the brake pressure of a displacer assembly 5 is to be controlled wheel by wheel, the outlet valve 8 assigned to the respective axle is opened, so that the pressure of the respective displacer assembly 5 can be set by the actuation of the inlet valve 6 assigned to this displacer assembly 5 and of the assigned connecting valve 7. If the brake pressure is to be controlled axle by axle, the connecting valves 7 between the displacer assemblies 5 of an axle are opened, so that the pressure of the two displacer assemblies 5 of this axle can be controlled simultaneously by the actuation of one of the inlet valves 6 assigned to this axle or of both inlet valves 6 of this axle and by the actuation of the outlet valve 8 assigned to this axle.

If necessary, the pressure accumulators 4' and 4" are recharged by means of the pumps 3 and 2". For this purpose, the control device actuates the motors 1' and 1" as a function of the signals from the pressure sensors 20' and 20".

It will now be assumed that a system fault occurs. For example, the control 17, which constantly checks itself and the system cooperating with it for correct functioning, may notice an error. Instead, a fault in the electrical supply could also have occurred. In both instances, the current supply to the electromagnets of the valves 6 to 9 is interrupted, so that these valves 6 to 9 assume the positions of rest illustrated in FIG. 1. This is the equivalent to a situation in which the working chambers 10' and 10" of the master brake cylinder 10 are connected hydraulically to the displacer assemblies 5 of the wheel brakes of an axle and the wheel brakes are correspondingly directly actuated hydraulically in a basically conventional way during the actuation of the pedal 11.

Figure 2:
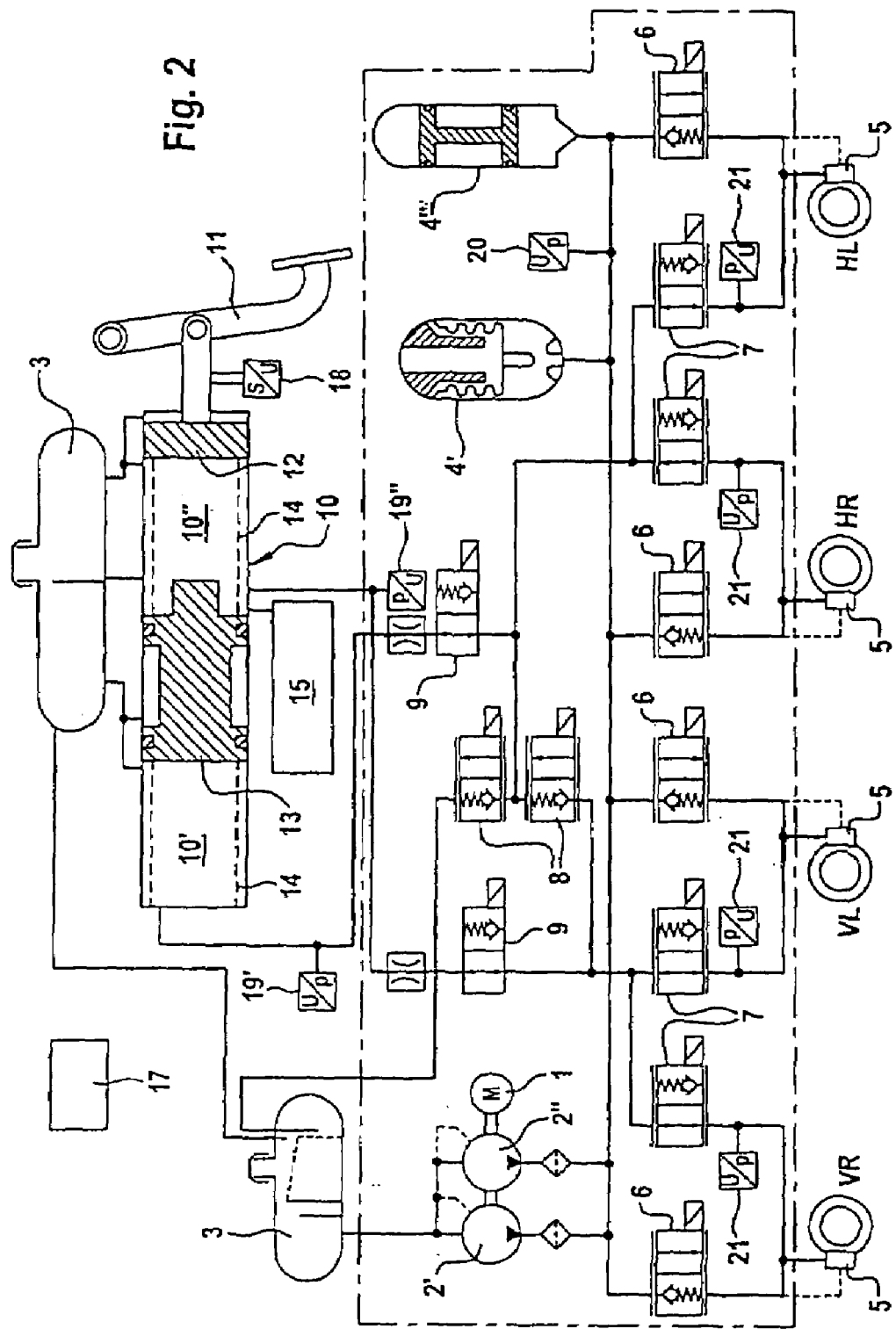
FIG. 2 shows a a braking system according to the invention.

The embodiment illustrated in FIG. 2 shows, that the pumps 2' and 2" may also pump in parallel into a common delivery line which may include a pressure accumulator 4' or a pressure accumulator 4" of different design, the above-mentioned delivery line being assigned to the wheels of all the axles of the vehicle in the example of FIG. 2.

An especially essential particular feature resides in the arrangement of the outlet valves 8. In the embodiment of FIG. 2, the outlet valves 8 are arranged in series. The outlet valve 8, which is assigned to the rear wheels HR and HL and has the associated connecting line connected to the interconnected sides of the connecting valves 7 of the rear wheels HR and HL, is arranged between the hydraulic reservoir 3 and the outlet valve 8 of the front wheels VR and VL.

During normal operation, there is no appreciable difference due to this modified hydraulic connection of the outlet valves 8, as compared with the embodiment of FIG. 1, because it may regularly be assumed that a lower hydraulic pressure is to prevail at the displacer assemblies 5 of the rear wheels HR and HL than at the displacer assemblies 5 of the front wheels. Accordingly, the outlet valve 8 assigned to the rear wheels is regularly opened even when the outlet valve 8 assigned to the front wheels has to be opened. Moreover, during normal operation, both outlet valves may also remain open when the pressure of the displacer assemblies 5 is in each case reduced wheel by wheel via the connecting valves 7.

The circuit of FIG. 2, on the one hand, has the advantage that, if appropriate, a simultaneous pressure setting at the displacer assemblies 5 of all the axles is possible in that the outlet valve 8 assigned to the front wheels and all the connecting valves 7 remain constantly open and the pressure of the displacer assemblies 5 is controlled solely by the actuation of the outlet valve 8 of the rear wheels and of at least one of the inlet valves 6, while the remaining inlet valves 6 remain closed or are at least partially controlled simultaneously by means of the one inlet valve 6.

Furthermore, a great advantage is achieved in emergency operation. In this operating phase, it is important that no hydraulic medium can escape to the reservoir 3 via the outlet valves 8 which are then closed. Should the very rare situation arise, however, where one of these valves does not close completely due to contamination and therefore has a certain leakage, this leakage very likely does not have an effect on the actuation of the displacer assemblies 5 of the front wheels VR and VL, since two outlet valves 8 connected in series would have to be simultaneously leaky. A very considerably increased degree of safety in an emergency is thus provided.

In all the embodiments described above, it is desirable to keep the hydraulic system free of air or of gas. This applies particularly to the hydraulic connections between the auxiliary pressure source or the master brake cylinder 10 and the displacer assemblies 5 of the wheel brakes.

For the purpose of venting the system, an operating mode is preferably provided whereby constant or regular venting is forcibly brought about.

For this purpose, , at the end of a braking maneuver when the brake pedal 11 reaches or assumes its non-actuated end position, the outlet valves 8 may be closed and the separating valves 9 may be opened. Since the connecting valves 7 are open, with the brake not actuated, and since the inlet valves 6 are closed in this operating state, due to what is known as the lifting play, which necessarily occurs for the displacer assemblies 5, the brake shoes or brake blocks being actuated by the displacer assemblies 5, lift off from the wheel-side brake surfaces or brake disks, as hydraulic medium flows back toward the master brake cylinder 10 which, with the brake pedal not actuated, connects its delivery side to the reservoir 3. Correspondingly, air or gas or vapor bubbles which are possibly present in this system move toward the reservoir 3. This action can be assisted by the master brake cylinder 10 and its connections being arranged in such a way that air, gas or vapor bubbles possibly entering one of the chambers 10' or 10" can rise toward the reservoir-side connection of the respective working chamber 10' or 10".

This venting operation may, if appropriate, also be assisted in that, with the brake pedal 11 not actuated, the control device 17 temporarily opens the inlet valves 6 slightly from time to time, while the connecting valves 7 and the blocking valves 9 are opened or remain open. This results in a hydraulic fluid flow from the inlet valves 6 via the assigned displacer assemblies 5 to the non-actuated master brake cylinder 10 and consequently to the reservoir 3. Possible air, gas or vapor bubbles are flushed into the reservoir 3 by this hydraulic fluid flow.

Moreover, the displacer assemblies 5 are expediently designed or arranged in such a way that their connection leading to the respective connecting valve 7 also constitutes the venting connection, into which air, gas or vapor bubbles flow automatically because of their buoyancy in a hydraulic medium.

In the embodiments of FIGS. 1 and 2, the chamber 10' assigned to the floating piston 13 of the brake master cylinder 10 is assigned to the displacer assemblies 5 of the rear wheels HR and HL. This arrangement affords the possibility of limiting the travel of the floating piston 13 by means of a stop, as compared with the possible travel of the piston 12 coupled mechanically to the brake pedal 11, in such a way that the latter piston 12 can still move further when the floating piston 13 already bears against the stop. Brake force limitation for the rear wheels can thereby be achieved during emergency operation.

Basically, however, it is possible to exchange the connections at the brake master cylinder 10 which are on the rear-wheel side and on the front-wheel side, if different stroke travels for the two pistons and brake force limitation for the rear wheels can be or are to be dispensed with.

In the example of FIG. 1, motors 1' and 1" which are separate from one another are provided for the two pumps 2' and 2". Instead, it is also possible to arrange only a single motor and to drive-connect the latter to the pumps 2' and 2" via two couplings parallel to one another and engageable independently of one another.

In the example of FIG. 2, if appropriate, one of the pumps 2' or 2" may then be eliminated.

The pressure on the delivery side of the pumps 2' and 2" should not exceed a predetermined maximum pressure. This can be carried out by the corresponding operation of the pumps 2' and 2", that is to say by correspondingly switching on and switching off the motor assigned in each case or by closing or opening the coupling between the respective pump 2' or 2" and the assigned motor.

Also, pressure-limiting valves can be provided at the delivery side of the pumps 2' and 2", so that the pressure on the delivery side is positively limited. Instead, it is possible to design the inlet valves 6, the connecting valves 7 and the outlet valves 8 as differential-pressure valves or as pressure-limiting valves, so that they can open even in the closing state in the event of undesirable excess pressures. Moreover, the valves 6 to 8, irrespective of their design, can be activated by the control 17 in such a way that the pressure in the braked and/or non-braked state is limited to a permissible amount.

In FIGS. 1 and 2, the simulator 15 is connected to the chamber 10" of the brake master cylinder 10. In principle, the simulator 15 may also be assigned to the other chamber 10'. Moreover, it is also possible to provide mechanical springing in the drive connection between pedal 11 and piston 12, instead of a component which receives an increasing hydraulic volume in the case of an increasing hydraulic pressure. This, too, ensures that, when the brake is operating normally, the pedal 11 can execute a pedal travel counter to increasing resistance.

The simulator 15, may, in principle, be lockable, locking taking effect automatically especially when the changeover to emergency operation has to be made. The locking achieves a more "rigid" coupling between the brake master cylinder 10 and displacer assemblies 5. Locking is not necessary for functioning, however, so that, if appropriate, it may even be dispensed with.

Instead of mechanical locking which blocks the piston of the simulator 15, hydraulic locking may also be provided in that the supply and discharge of hydraulic medium to and from the simulator 15 can be blocked by means of a normally closed on-off valve.

The pressure sensor 19' assigned to the chamber 10' of the brake master cylinder 10 may be eliminated, if appropriate, since the driver's intention to brake can already be detected by the travel sensor 18 and the pressure sensor 19" when the brake pedal 11 is actuated.

Instead of controllable connecting valves 7 and/or controllable outlet, valves 8, even simple switch valves may be provided, if appropriate, since the pressure of the displacer assemblies 5 and consequently the respective braking force of the wheel brakes can be regulated even solely by the control of the inlet valves 6. The use of control valves illustrated in FIGS. 1 and 2, has the advantage that different hydraulic pressures can be provided at the different displacer assemblies 5 of the same axle.

The arrangement of valve seat-controlled valves is particularly expedient with a view to a leakage-free closing state of the valves 6 to 9.

What is claimed is:

1. A hydraulic braking system operated by an external force, for vehicles, in particular motor vehicles, having at least two axles, comprising
   a low-pressure-side hydraulic reservoir (3),
   at least one primary pressure source (2', 2") which is operated by external energy and which is connected to the hydraulic reservoir (3) for the supply of a hydraulic medium,
   an auxiliary pressure source (10) which is independent of said primary pressure source (2', 2") and can be actuated by an operator and which is connected to the hydraulic reservoir (3) for the supply of hydraulic medium and the delivery side of which communicates with the hydraulic reservoir (3) in the non-actuated state off the auxiliary pressure source (10),
   displacer assemblies (5) each being assigned to a wheel brake for independent actuation of the latter,
   normally closed controllable inlet valves (6) which are assigned each separately to the displacer assembly (5) for the controllable connection of the latter to the primary pressure source or to one of the primary pressure sources (2', 2"),
   normally open connecting valves (7) which are assigned each to the displacer assembly (5) and in parallel to the respective inlet valve (6) and which are interconnected with one another, axle by axle, on their side facing away from the assigned displacer assembly (5),
   a normally closed outlet valve (8) which is assigned each to an axle and arranged in each case between the hydraulic reservoir (3) and the interconnected sides of the connecting valves (7) of the respective axle, and
   normally open separating valves (9) which are assigned each to an axle and are arranged in each case parallel to the outlet valve (8) of the respective axle between the auxiliary pressure source (10) and the interconnected sides of the connecting valves (7) of this axle, other axles including further outlet valves (8) between the hydraulic reservoir (3) and the interconnected sides of the connecting valve (7) of these axles and further separating valves (9) being arranged between the delivery side of the auxiliary pressure source (10) and the interconnected sides of the connecting valves (7) of these axles, the outlet valves (8) forming a series connection, in which the connecting valves (7) of a second axle are connected in each case between the outlet valves of the first and of the second axle.

2. The braking system operated by an external force as claimed in claim 1, wherein the first axle is a front axle and the second axle a rear axle.

3. The braking system operated by an external force as claimed in claim 1, wherein the connecting valves (7) and the outlet valves (8) are control valves.

4. The braking system operated by an external force as claimed in claim 1, wherein all valves (6 to 9) are seat-controlled valves.

5. The braking system operated by an external force as claimed in claim 1, wherein at least part of the hydraulic medium displaced from at least one of the displacer assemblies (5) as a result of lifting play, with the wheel brakes not actuated, is conducted to the auxiliary pressure source (10) via the separating valve (9) assigned to the respective axle.

6. The braking system operated by an external force as claimed in claim 1, wherein a line path, leading to the auxiliary pressure source (10), of each displacer assembly (5) is designed as a venting path whereby air, gas and vapor bubbles travel to the auxiliary pressure source by virtue of buoyancy.

7. The braking system operated by an external force as claimed in claim 1, wherein connections between the auxiliary pressure source (10) and reservoir (3) are designed as venting paths, in such a way that air, gas and vapor bubbles travel to the reservoir by virtue of buoyancy.

8. The braking system operated by an external force as claimed in one claim 1, wherein, at the end of a braking maneuver, the outlet valves (8) are closed and the separating valves (9) opened, and, as a result of a lifting play of the displacer assemblies (5) due to the connecting valves (7) being open, with the brake not actuated, a hydraulic stream assisting a venting of the system to a system part (10), which is open to the atmosphere, can be generated.

* * * * *